(12) United States Patent
Borowski et al.

(10) Patent No.: US 12,220,774 B2
(45) Date of Patent: Feb. 11, 2025

(54) SYSTEMS AND METHODS FOR MULTIPLE SOURCE CONTROL OF AN ENGINE DRIVEN POWER SYSTEM

(71) Applicant: Illinois Tool Works Inc., Glenview, IL (US)

(72) Inventors: James Donald Borowski, Greenville, WI (US); Jeffery R. Ihde, Greenville, WI (US)

(73) Assignee: Illinois Tool Works Inc., Glenview, IL (US)

( * ) Notice: Subject to any disclaimer, the term of this patent is extended or adjusted under 35 U.S.C. 154(b) by 319 days.

(21) Appl. No.: 17/031,377

(22) Filed: Sep. 24, 2020

(65) Prior Publication Data
US 2021/0114129 A1   Apr. 22, 2021

Related U.S. Application Data

(60) Provisional application No. 62/924,393, filed on Oct. 22, 2019.

(51) Int. Cl.
*B23K 9/10* (2006.01)
*F02B 63/04* (2006.01)
*F02N 11/08* (2006.01)

(52) U.S. Cl.
CPC .......... *B23K 9/1062* (2013.01); *B23K 9/1068* (2013.01); *B23K 9/1087* (2013.01); *F02B 63/042* (2013.01); *F02N 11/0807* (2013.01)

(58) Field of Classification Search
CPC ........ B23K 9/09; B23K 9/095; B23K 9/0953; B23K 9/0956; B23K 9/10; B23K 9/1062; B23K 9/1068; B23K 9/1087
See application file for complete search history.

(56) References Cited

U.S. PATENT DOCUMENTS

| | | | | |
|---|---|---|---|---|
| 8,592,722 B2 * | 11/2013 | Ulrich | ................. | B23K 9/1087 700/212 |
| 9,511,444 B2 * | 12/2016 | Marschke | ............. | B23K 9/173 |
| 10,981,249 B2 * | 4/2021 | Watanabe | ............ | B23K 26/402 |
| 2005/0199605 A1 * | 9/2005 | Furman | .................. | B23K 9/095 219/137.71 |
| 2006/0207980 A1 * | 9/2006 | Jacovetty | ............. | B23K 9/1062 219/130.5 |
| 2008/0116186 A1 * | 5/2008 | Luck | .................... | B23K 9/1062 219/132 |

(Continued)

OTHER PUBLICATIONS

Eurpean office communcation with extended European Search Report Appln. No 20201779.4, Apr. 22, 2021.

*Primary Examiner* — Jimmy Chou

(74) *Attorney, Agent, or Firm* — McAndrews, Held & Malloy, Ltd.

(57) ABSTRACT

Systems and methods for controlling an engine driven power system and/or a welding system from two or more control sources are disclosed. In some examples, multiple control devices or sources are in communication with a central control circuitry of the engine driven power system, and/or a welding system which is capable of managing commands from multiple control sources by prioritizing commands and/or limited the scope of control. In some examples, the central control circuitry controls the multiple control sources to update systems and displays to harmonize commands and/or data that originated at another source.

19 Claims, 9 Drawing Sheets

(56) References Cited

U.S. PATENT DOCUMENTS

| | | | |
|---|---|---|---|
| 2012/0012561 A1* | 1/2012 | Wiryadinata | B23K 9/1087 219/108 |
| 2013/0043226 A1* | 2/2013 | Stanzel | B23K 9/1006 219/130.21 |
| 2013/0319987 A1* | 12/2013 | Beistle | B23K 9/1087 219/132 |
| 2014/0069899 A1 | 3/2014 | Mehn | |
| 2014/0069900 A1* | 3/2014 | Becker | B23K 9/0953 219/130.01 |
| 2014/0131329 A1* | 5/2014 | Meckler | H02J 7/16 219/130.1 |
| 2014/0263225 A1* | 9/2014 | Daniel | B23K 9/1043 219/125.1 |
| 2015/0114942 A1* | 4/2015 | Denis | H04W 4/70 219/132 |
| 2015/0273607 A1* | 10/2015 | Denis | F02N 11/0807 219/133 |
| 2015/0273609 A1* | 10/2015 | Denis | B23K 9/1043 219/132 |
| 2015/0273611 A1* | 10/2015 | Denis | H04W 12/50 219/132 |
| 2015/0350821 A1* | 12/2015 | Dina | B23K 9/1087 455/41.2 |
| 2016/0129521 A1* | 5/2016 | Wiryadinata | B23K 9/1043 219/130.21 |
| 2016/0167153 A1* | 6/2016 | Denis | H04W 12/50 219/132 |
| 2017/0036288 A1* | 2/2017 | Albrecht | B23K 31/125 |
| 2017/0185058 A1* | 6/2017 | Holverson | G06Q 10/06 |
| 2018/0095640 A1* | 4/2018 | Albright | B23K 9/1087 |
| 2018/0161910 A1* | 6/2018 | Enyedy | B23K 9/1062 |
| 2019/0240761 A1* | 8/2019 | Petrila | B23K 9/0956 |

\* cited by examiner

SYSTEMS AND METHODS FOR MULTIPLE SOURCE CONTROL OF AN ENGINE DRIVEN POWER SYSTEM

CROSS REFERENCE TO RELATED APPLICATIONS

This application is a Non-Provisional patent application which claims priority to U.S. Provisional Patent Application No. 62/924,393, entitled "SYSTEMS AND METHODS FOR MULTIPLE SOURCE CONTROL OF AN ENGINE DRIVEN POWER SYSTEM", filed Oct. 22, 2019, the contents of which are herein incorporated by reference in their entirety.

BACKGROUND

Conventionally, engine driven power systems utilized integrated control and diagnostic systems. For example, a control panel can be located with the engine-driven power system to provide access to controls at the system's location. If an operator wishes to control the engine-driven power system remotely, however, reconciling the control and/or diagnostic information with the control panel can be challenging. It is therefore desirable to employ systems and methods that address the issues associated with remote and local control of an engine-driven power system.

SUMMARY

Systems and methods for controlling an engine driven power system and/or a welding system from two or more control sources are disclosed, substantially as illustrated by and described in connection with at least one of the figures.

BRIEF DESCRIPTION OF THE DRAWINGS

The figures are not necessarily to scale. Where appropriate, similar or identical reference numbers are used to refer to similar or identical components.

DETAILED DESCRIPTION

Figure 1A:
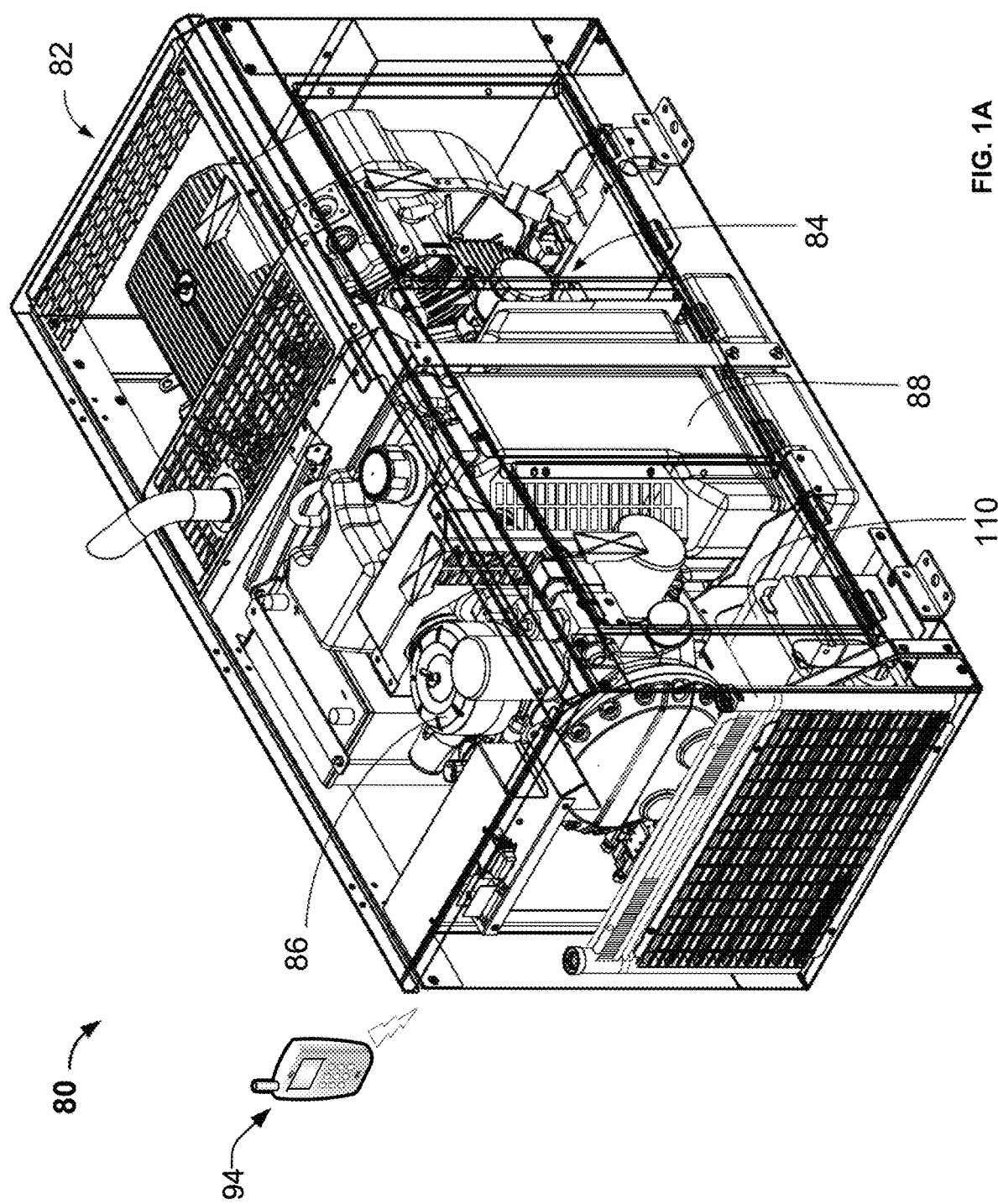
FIG. 1A is a perspective view of an example power system arranged within an enclosure.

Disclosed are systems and methods for controlling an engine driven power system and/or a welding system from two or more control sources. In some examples, multiple control devices or sources are in communication with a central control circuitry of the engine driven power system and/or a welding system, which is capable of managing commands from multiple control sources by prioritizing commands and/or limited the scope of control. In some examples, the central control circuitry controls the multiple control sources to update systems and displays to harmonize commands and/or data that originated at another source.

In particular, an example welding power system is provided. The welding power system can include one or more of a remote system (e.g. a remote control device), the engine driven power source, and/or the welding system (e.g., a welding power supply and/or one or more welding accessories). In some examples, the welding power system receives power from the engine driven power source, which is in communication with a remote device for monitoring or controlling the welding system. For example, a welding power supply to control and deliver power to one or more welding tools (e.g., a welding type torch) or accessories (e.g., a wire feeder). The welding power system further includes a central control circuitry with a central transceiver, which is configured to transmit signals to or receive signals from the remote device or the welding power supply via one or more interfaces and/or transceivers. In some examples, the central control circuitry serves as a central hub to ensure that controls or commands from multiple sources are not in conflict, thereby ensuring seamless operation of the welding power system even as multiple sources are configured to control the welding system.

In some examples, the central control circuitry is located within the welding power system. In some examples, the central control circuitry is located remote to the welding power system and communicably coupled to control circuitry governing operation of the welding system.

The central control circuitry receives the signals, which includes data corresponding to one or more operating parameters associated with the welding power system (e.g., voltage, a current, a power value, an engine status, a welding process, etc.). The signals may be generated from the remote device or the welding power supply (e.g., via a remote user interface or a welding user interface, respectively). The central control circuitry is configured to receive the signals generated from the remote device or the welding power supply, and identify a first value (e.g., a particular value provided via the user interfaces) of a first operating parameter (e.g., voltage) of the one or more operating parameters in the corresponding data. For example, the first value can be stored and/or analyzed at the central control circuitry.

The central control circuitry is then to control the welding power supply to adjust the first operating parameter of the welding power system to the first value. In some examples, the central control circuitry transmits the first value to the other of the remote device or the welding power supply that did not generate the one or more signals. A user interface of the remote device and the welding power supply are then updated to reflect the first value (e.g., update the displayed voltage value). Thus, after implementing the commanded adjustment, the user interface on both the remote device and the welding power system are updated to reflect the adjustment.

In some examples, the central control circuitry receives and implements commands from both the remote device and the welding power supply. For example, the central control circuitry can implement one or more techniques to avoid conflict between multiple control sources. The techniques can include implementing a priority scheme based on time of arrival of a signal, the source of the signal, and/or the received command (e.g., a shut of signal versus adjustment of a welding parameter).

Additionally or alternatively, the central control circuitry is configured to activate one or more modes to govern the source of control. For example, the central control circuitry can implement a shared control mode, such that each approved and connected control source can generate and provide commands to adjust an operating parameter of the power system.

In some examples, the central control circuitry is further configured to transmit a lock signal to activate an interlock (e.g. a mechanical or electronic lock) to prevent the remote user interface from controlling the welding power system in a display only mode (e.g., disabling the remote user interface, rejecting signals from the remote device, providing alerts to the remote device that control is unavailable, etc.). The remote device may be able to display diagnostic or other welding information on the remote user interface, but limited control is available.

In some examples, the remote device can operate in a dedicated control mode (e.g., a master control mode). For instance, a welding user interface of the welding power supply is prevented from controlling the welding system, but able to display diagnostic information or values associated with the welding operation (e.g., on the front panel of the welding power system or welding power source). In some examples, the remote device is further configured to transmit a lock signal to activate an interlock (e.g. a mechanical or electronic lock) to prevent the welding user interface from controlling the welding system. In other words, the remote device can transmit a command to take exclusive control of the welding system, received at the central control circuitry, which activates one or more techniques (e.g., an interlock) to prevent the welding power system to provide additional or alternate controls.

Additionally or alternatively, the remote device can operate in a supervisory control mode, such that the system allows control of the welding power system for a particular operating parameter or a certain operating range or (e.g., while operating in constant voltage mode, voltage may be adjusted but within a range of 14-16 VDC). In some examples, a wireless remote device is configured to control the starting and/or stopping of the engine from each of the multiple control sources.

Conventionally, welding systems only provide controls at the source (e.g., physically located on the device itself). If a remote is employed, it takes exclusive control, and is wired to the device.

In disclosed examples, the central control circuitry is capable of managing commands from multiple control sources by prioritizing commands and/or limited the scope of control Advantageously, the disclosed systems and methods ensure that commands and/or data that originated at one source will be updated at the second source. Thus, alerts are provided with respect to control of various components (e.g., the engine, generator, compressors, welding power supply, connected auxiliary devices, etc.) of the welding system, including changes to settings (e.g., to a particular welding process, a range of accepted values, timing requirements, etc.) that may not necessarily result in an immediate adjustment to a welding parameter, are automatically provided to each device (e.g., the associated memory, display, user interface, etc.).

Also advantageously, an operator can assign a source or device as a master, thereby limiting which welding parameters (or what scope of welding parameters) the other devices may control. Thus, control can be provided through a single source, while display of diagnostic or other information is automatically updated (e.g., in a supervisory or display only mode). Dedicated or master control is further ensured by activation of one or more locks (e.g., hardware and/or software), which prevents inadvertent changes from a non-master device.

Several examples are provided with respect to diesel engines driving one or more of a generator, an air compressor, and/or a welding power supply. However, the concepts and principles disclosed herein are equally applicable to various engine-driven products, including but not limited to home-standby generators, portable generators, and/or vehicles.

In disclosed examples, a welding power system comprises a remote device for monitoring or controlling the welding power system; a welding power supply to control and deliver power to one or more welding tools or accessories; a central control circuitry comprising a central transceiver configured to transmit one or more signals to or receive one or more signals from the remote device or the welding power supply, the one or more signals including data corresponding to one or more operating parameters associated with the welding power system, wherein the central control circuitry configured to: receive the one or more signals generated from one of the remote device or the welding power supply; identify a first value of a first operating parameter of the one or more operating parameters in the corresponding data; transmit the first value to the other of the remote device or the welding power supply that did not generate the one or more signals; and control the welding power system to adjust the first operating parameter to the first value.

In some examples, the central control circuitry is further configured to activate a supervisory mode to limit the remote device control of the one or more operating parameters of the welding power system to a predetermined range of values. In examples, wherein the remote device is configured to adjust a voltage value a range of 10-20 volts in the supervisory mode.

In some examples, the central control circuitry is further configured to transmit a lock signal to activate an interlock to prevent the remote user interface from controlling the welding power system in the display only mode. In examples, the remote device comprises a dedicated control mode such that a welding user interface is prevented from controlling the welding power system. In examples, the remote device is further configured to transmit a lock signal to activate an interlock to prevent the welding user interface from controlling the welding power system.

In some examples, remote control circuitry is further configured to: receive an input via the remote user interface to control the first operating parameter; transmit data associated with the input to the central control circuitry; receive a confirmation signal that the input was received at the central control circuitry and that the welding power system has adjusted the first operating parameter based on the input; and adjust an indicia corresponding to the first operating parameter on the remote user interface to reflect the change at the welding power system.

In examples, the one or more parameters comprise one or more of a voltage, a current, a power value, an engine status, or a welding process. In some examples, the central control circuitry is further configured to generate an alert when an operating parameter value of the one or more operating parameters is adjusted at the welding power system or the remote device. In examples, the central control circuitry is further configured to initiate transfer of data between the remote system and the welding power system at periodic intervals, in response to an adjustment to the one or more welding parameters, in response to a user input, or a combination thereof.

In some examples, the remote control circuitry further comprises a network interface to connect to a remote computing system via one or more of LAN, WAN, Bluetooth, Wi-Fi, or cellular networks. In examples, the one or more indicia reflects information displayed on the welding user interface. In examples, the one or more indicia comprises an icon, text, a graphic, or an animation, corresponding to the one or more welding parameters of the welding power system.

In disclosed examples, a hybrid welding power system comprises a remote device for monitoring or controlling the welding power system; a welding power supply to control and deliver power to one or more welding tools or accessories, the welding power supply configured to receive power from an energy storage device and an engine, and to condition the power for operation of the one or more welding tools or accessories; a central control circuitry comprising a central transceiver configured to transmit one or more signals to or receive one or more signals from the remote device or the welding power supply, the one or more signals including data corresponding to one or more operating parameters associated with the welding power system, wherein the central control circuitry is configured to: receive the one or more signals generated from one of the remote device or the welding power supply; identify a first value of a first operating parameter of the one or more operating parameters in the corresponding data; transmit the first value to the other of the remote device or the welding power supply that did not generate the one or more signals; and control the welding power system to adjust the first operating parameter to the first value.

In some examples, the central control circuitry is further configured to: store the data corresponding to the one or more operating parameters in a memory storage device; analyze the data corresponding to the one or more operating parameters to determine parameter values associated with the one or more operating parameters; compare the parameter values to a list of parameter icons that correlates parameter values to a plurality of icons; determine a parameter icon of the plurality of icons corresponding to the one or more operating parameters; and transmit icon data to the remote device or the welding power source for display on the remote user interface or the welding user interface, respectively.

In examples, the remote device is a portable handheld wireless device. In some examples, the remote control circuitry is further configured to: transmit information to and receive information from an auxiliary device; receive diagnostic information from the auxiliary device; and display the diagnostic information on one or more regions of the remote user interface.

In some examples, the remote control circuitry is further configured to: receive commands or data from the welding power supply; and transmit the commands or data from the welding power supply to the auxiliary device. In examples, the remote control circuitry is further configured to: receive commands or data from the auxiliary device; and transmit the commands or data from the auxiliary device to the welding power supply. In examples, the auxiliary device is a wire feeder. In examples, the remote user interface or the welding user interface comprises one or more of a knob, a membrane panel switch, or a graphical user interface to provide input to control the welding power system.

In some examples, the signals between the remote system and the welding power system are encoded with information to uniquely identify the respective system. In examples, the signals between the remote system and the welding power system are transmitted with one or more transmission characteristics to uniquely identify the respective system.

In some examples, an engine is configured to turn a generator to provide power to the welding power supply, the remote system being further configured to: receive an input via the remote user interface to control the engine to start, stop, or change engine speed; transmit data associated with the input to the central control circuitry; receive a confirmation signal that the input was received at the central control circuitry and that the engine operation has been adjusted based on the input; and display an indicia corresponding to adjusted engine operation on the remote user interface.

As used herein, "power conversion circuitry" and/or "power conversion circuits" refer to circuitry and/or electrical components that convert electrical power from one or more first forms (e.g., power output by a generator) to one or more second forms having any combination of voltage, current, frequency, and/or response characteristics. The power conversion circuitry may include safety circuitry, output selection circuitry, measurement and/or control circuitry, and/or any other circuits to provide appropriate features.

As used herein, the terms "first" and "second" may be used to enumerate different components or elements of the same type, and do not necessarily imply any particular order.

The term "welding-type system," as used herein, includes any device capable of supplying power suitable for welding, plasma cutting, induction heating, Carbon Arc Cutting-Air (e.g., CAC-A), and/or hot wire welding/preheating (including laser welding and laser cladding), including inverters, converters, choppers, resonant power supplies, quasi-resonant power supplies, etc., as well as control circuitry and other ancillary circuitry associated therewith.

As used herein, the term "welding-type power" refers to power suitable for welding, plasma cutting, induction heating, CAC-A and/or hot wire welding/preheating (including laser welding and laser cladding). As used herein, the term "welding-type power supply" and/or "power supply" refers to any device capable of, when power is applied thereto, supplying welding, plasma cutting, induction heating, CAC-A and/or hot wire welding/preheating (including laser welding and laser cladding) power, including but not limited to inverters, converters, resonant power supplies, quasi-resonant power supplies, and the like, as well as control circuitry and other ancillary circuitry associated therewith.

As used herein, a "circuit," or "circuitry," includes any analog and/or digital components, power and/or control elements, such as a microprocessor, digital signal processor (DSP), software, and the like, discrete and/or integrated components, or portions and/or combinations thereof.

The terms "control circuit," "control circuitry," and/or "controller," as used herein, may include digital and/or analog circuitry, discrete and/or integrated circuitry, microprocessors, digital signal processors (DSPs), and/or other logic circuitry, and/or associated software, hardware, and/or firmware. Control circuits or control circuitry may be located on one or more circuit boards that form part or all of a controller, and are used to control a welding process, a device such as a power source or wire feeder, and/or any other type of welding-related system.

As used herein, the term "memory" includes volatile and non-volatile memory devices and/or other storage device.

As used herein, the term "torch," "welding torch," "welding tool" or "welding-type tool" refers to a device configured to be manipulated to perform a welding-related task, and can include a hand-held welding torch, robotic welding torch, gun, gouging tool, cutting tool, or other device used to create the welding arc.

As used herein, the term "welding mode," "welding process," "welding-type process" or "welding operation" refers to the type of process or output used, such as current-controlled (CC), voltage-controlled (CV), pulsed, gas metal arc welding (GMAW), flux-cored arc welding (FCAW), gas tungsten arc welding (GTAW, e.g., TIG), shielded metal arc welding (SMAW), spray, short circuit, CAC-A, gouging process, cutting process, and/or any other type of welding process.

As used herein, the term "welding program" or "weld program" includes at least a set of welding parameters for controlling a weld. A welding program may further include other software, algorithms, processes, or other logic to control one or more welding-type devices to perform a weld.

FIG. 1A is a perspective view of an example power system 80 arranged within an enclosure 82. The example power system 80 of FIG. 1A is an engine-driven power system. The system 80 includes an engine 84 that drives a generator 86 to generate electrical power. The engine 84 receives fuel from a fuel tank. The generator 86 provides the electrical power to an air compressor 88 and/or power conversion circuitry 110. The power conversion circuitry 110 provides one or more types of electrical power suitable for specific and/or general purpose uses, such as welding power, 110 VAC and/or 220 VAC power, battery charging power, and/or any other type of electrical power. In some examples, the power system 80 includes and/or is configured to receive power from one or more alternative or auxiliary power sources (e.g., mains power, energy storage devices, solar paneling, hydrogen fuel cells, etc.). For instance, the power conversion circuitry 110 is configured to condition the power from a variety of power sources for operation of the one or more welding tools or accessories. The example system 80 may include other components not specifically discussed herein.

Figure 2A:
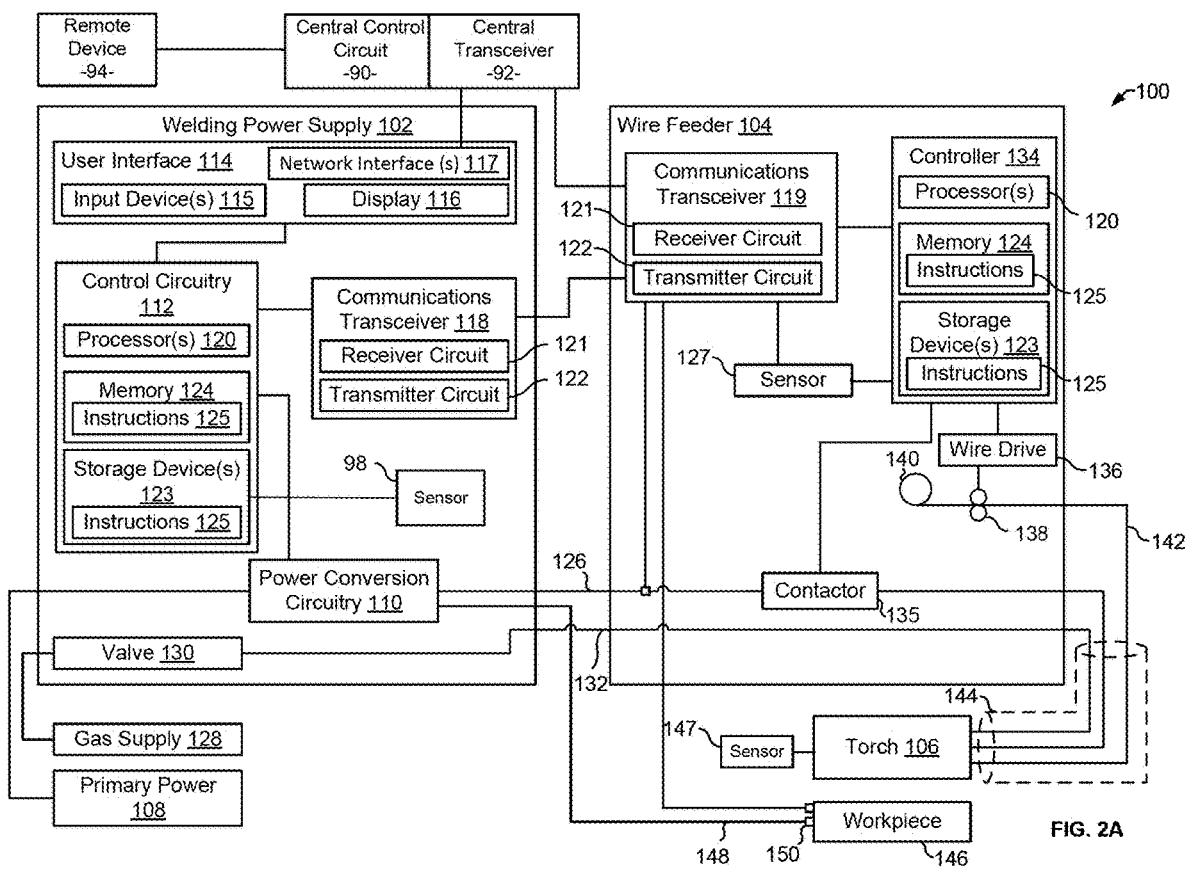
FIG. 2A is a schematic diagram of an example welding system, in accordance with aspects of this disclosure.
Figure 2B:
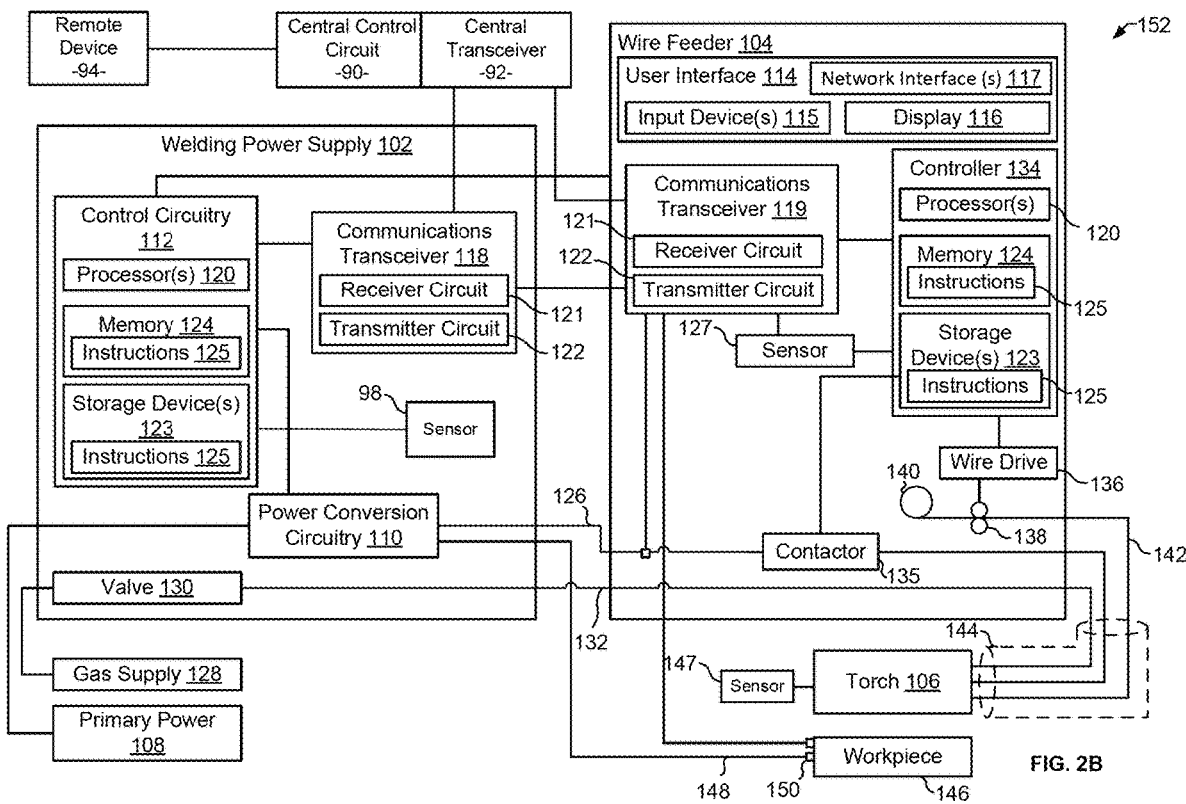
FIG. 2B is a schematic diagram of another example welding system, in accordance with aspects of this disclosure.
Figure 2C:
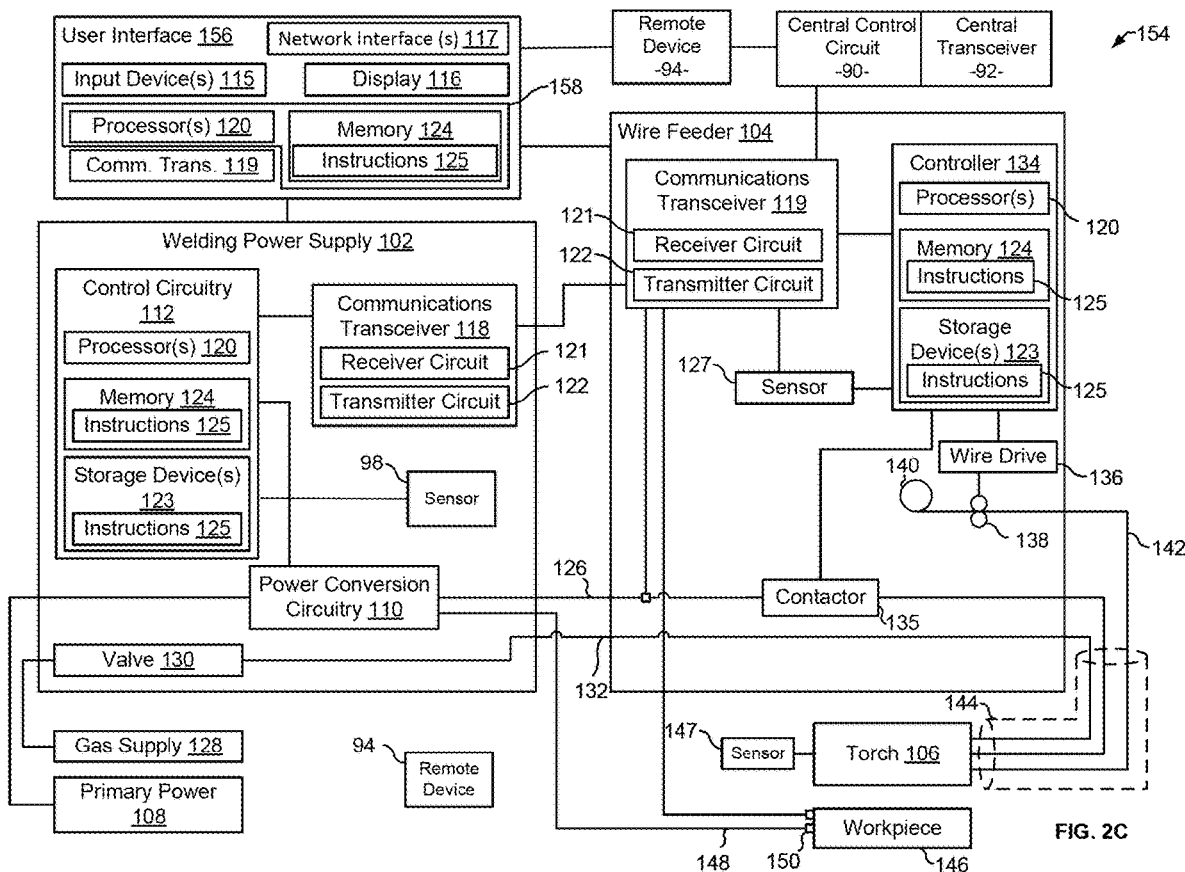
FIG. 2C is a schematic diagram of another example welding system, in accordance with aspects of this disclosure.

In some examples, a control circuitry 112 is included with the power conversion circuitry 110 (e.g., as a part of a welding power supply 102 of a welding system 100, as shown in FIGS. 2A-2C). In other examples, the control circuitry 112 is located within the enclosure 82 in a location separate from the power conversion circuitry 110. In some examples, the control circuitry 112 is located outside the enclosure 82 and communicates with components and/or circuits within the enclosure 86 via wired and/or wireless connections (e.g., network interfaces, transceivers, etc.).

In some examples, a remote device 94 is configured to control one or more operations of the system 80. For example, the remote device 94 can include a display (e.g., a graphical user interface, and/or a touchscreen), as well as one or more input devices (e.g., a button, knob, switch, and/or a touchscreen).

Figure 1B:
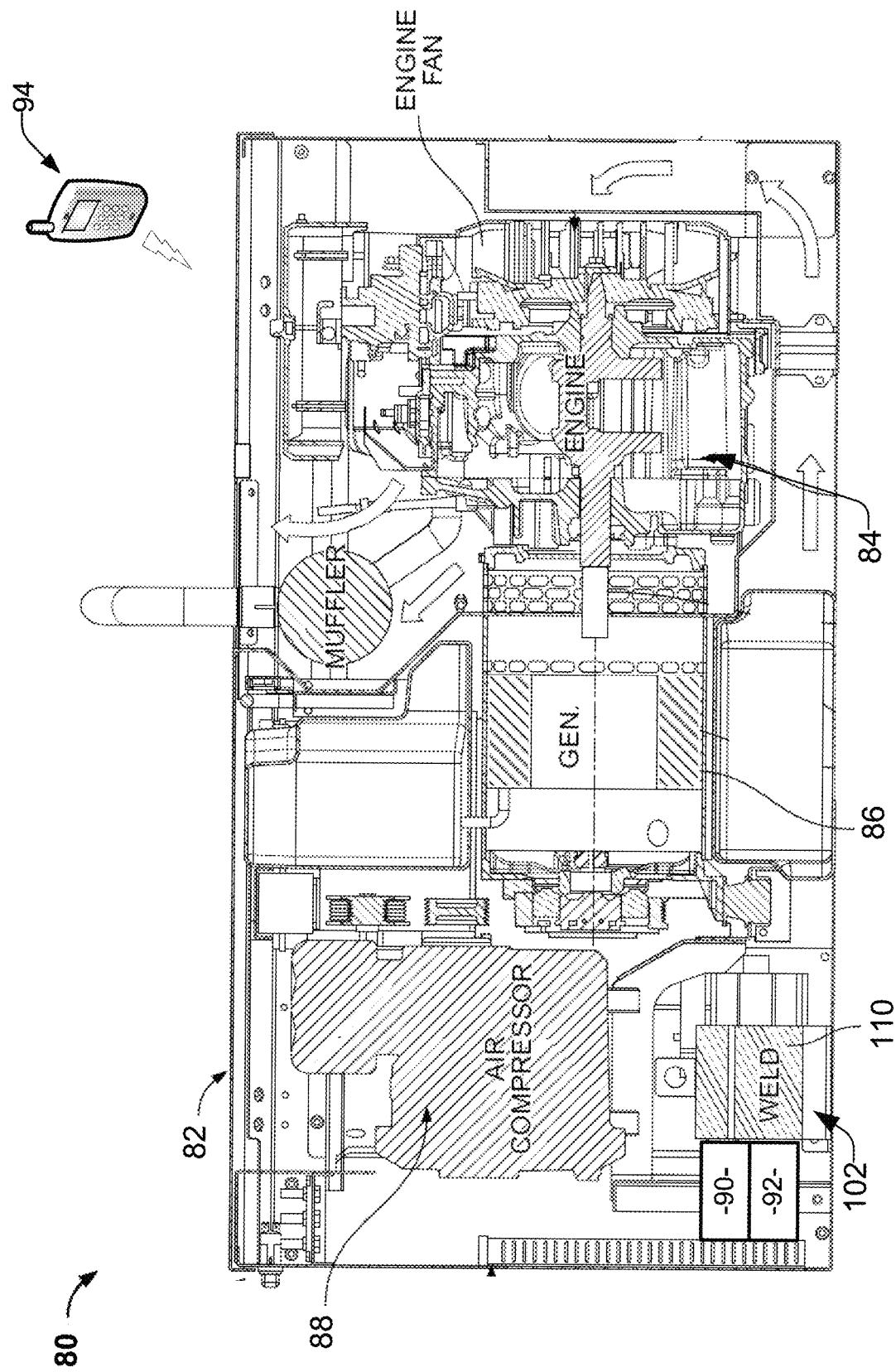
FIG. 1B is a side view of the example power system of FIG. 1A.
Figure 1C:
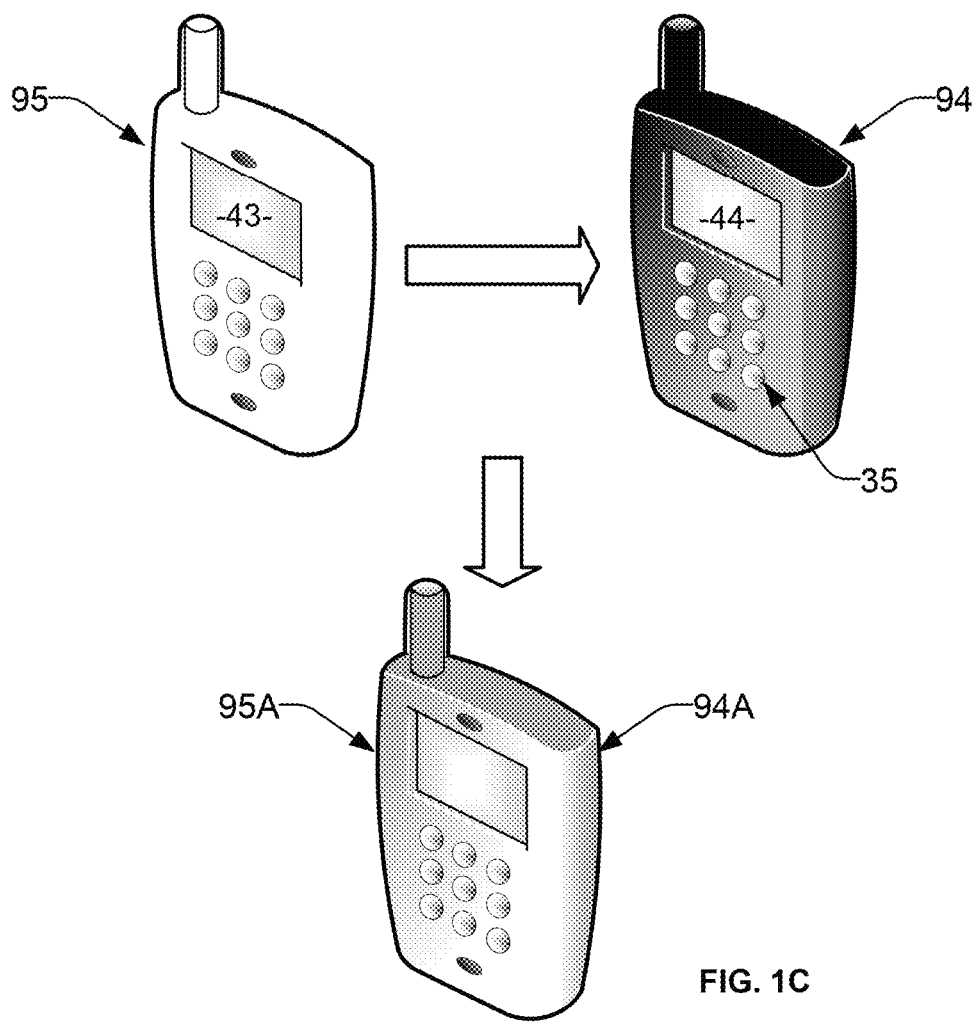
Figure 1D:
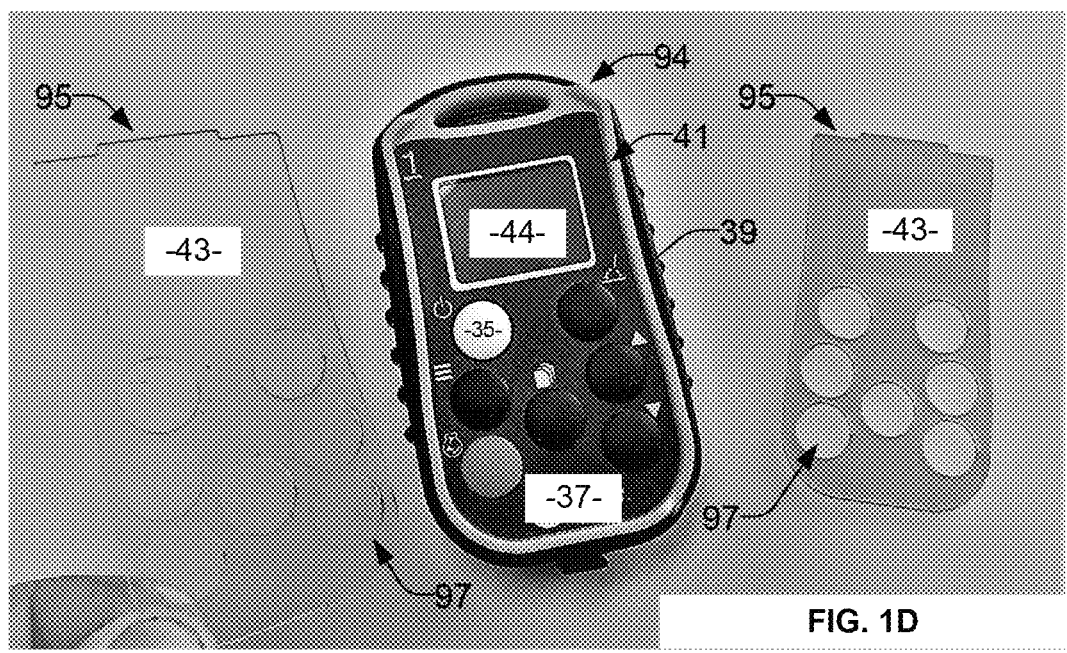

FIG. 1B is another perspective view of the example power system 80 with selected panels of the enclosure 82 and the fuel tank removed. The arrangements of the engine 84, the generator 86, the air compressor 88, and the power conversion circuitry 112 can be more easily seen in FIG. 1B). By use of the remote device 94, an operator can transmit commands as well as receive information and alerts from a central control circuitry 90 (see FIG. 1B-2C) via one or more of a central communications transceiver and/or interface 92 (e.g., shown in FIG. 1B-2C). Additionally, the remote device 94 may provide the status of the power system 80 and the connected components (e.g., on the display and/or via audible and/or haptic feedback).

In examples, the remote device 94 is configured to transmit a start command for the engine via the central transceiver 92. Once the central control circuitry 90 has determined that an engine start is commanded, the central control circuitry 90 activates the engine 84 to start. The remote device 94 can shut the engine 84 down by sending a stop command via the central transceiver 92.

For example, the operator may utilize the remote device 94 to select a command to start the engine 84. As disclosed herein, multiple devices or control sources are in communication with the central control circuitry 90 of the engine driven power system 80, which is capable of managing commands from multiple control sources by prioritizing commands and/or limited the scope of control. In some examples, the central control circuitry 90 controls the multiple control sources to update systems and displays to harmonize commands and/or data that originated at another source.

In some examples, a welding system 100 receives power from engine driven power system 80, which is in communication with remote device 94 for monitoring or controlling the welding system 100 (and/or the engine driven power system 80). For example, a welding power supply 102 is provided to control and deliver power to one or more welding tools (e.g., a welding type torch 106) or accessories (e.g., a wire feeder 104). In some examples, the central control circuitry 90 serves as a central hub (or clearinghouse) to ensure that controls or commands from multiple control sources are not in conflict, thereby ensuring seamless operation of the welding system 100 even as multiple sources are configured to control the welding system 100 and/or the power system 80.

In some examples, the central control circuitry 90 is located within the welding system 100. In some examples, the central control circuitry 90 is located remote to the welding system 100 and/or the power system 80 (e.g., in a remote computing device) and communicably coupled to control circuitry governing operation of the welding system.

The central control circuitry 90 receives the signals, which includes data corresponding to one or more operating parameters associated with the welding system 100 (e.g., voltage, a current, a power value, an engine status, a welding process, etc.). The signals may be generated from the remote device 94 or the welding power supply 102 (e.g., via a remote user interface or a welding user interface, respectively). The central control circuitry 90 is configured to receive the signals generated from the remote device 94 or the welding power supply 102, and identify a first value (e.g., a particular value provided via the user interfaces) of a first operating parameter (e.g., voltage) of the one or more operating parameters in the corresponding data. For example, the first value can be stored and/or analyzed at the central control circuitry 90.

The central control circuitry 90 is then to control the welding power supply 102 to adjust the first operating parameter of the welding system 102 to the first value. In some examples, the central control circuitry 90 transmits the first value to the other of the remote device 94 or the welding power supply 102 that did not generate the one or more signals. A user interface of the remote device and the welding power supply are then updated to reflect the first value (e.g., update the displayed voltage value). Thus, after implementing the commanded adjustment, the user interface on both the remote device and the welding system is updated to reflect the adjustment.

In some examples, the central control circuitry 90 receives and implements commands from both the remote device 94 and the welding power supply 102. For example, the central control circuitry 90 can implement one or more techniques to avoid conflict between multiple control sources. The techniques can include implementing a priority scheme based on time of arrival of a signal, the source of the signal, and/or the received command (e.g., a shut of signal versus adjustment of a welding parameter).

Additionally or alternatively, the central control circuitry 90 is configured to activate one or more modes to govern the source of control. For example, the central control circuitry 90 can implement a supervisory mode to limit the remote device 94 control of the one or more operating parameters of the welding system 102 to a predetermined range of values. In some examples, the remote device 94 is configured to adjust a voltage value a range of 10-20 volts in the supervisory mode.

In examples, the central control circuitry 90 is further configured to transmit a lock signal to activate an interlock (e.g. a mechanical or electronic lock) to prevent the remote user interface from controlling the welding system 102 in the display only mode (e.g., disabling the remote user interface, rejecting signals from the remote device, providing alerts to the remote device that control is unavailable, etc.). The remote device 94 may be able to display diagnostic or other welding information on the remote user interface, but limited control is available.

In some examples, the remote device 94 can operate in a dedicated control mode. For instance, a welding user interface of the welding power supply 102 is prevented from controlling the welding system 102, but able to display diagnostic information or values associated with the welding operation (e.g., on the front panel of the welding system 102 or the power system 80). In some examples, the remote device 94 is further configured to transmit a lock signal to activate an interlock (e.g. a mechanical or electronic lock, at the transmitting device, receiving device, and/or device to be controlled) to prevent the welding user interface from controlling the welding system 100. In other words, the remote device 94 can transmit a command to take exclusive control of the welding system 100, received at the central control circuitry 90, which activates one or more techniques (e.g., an interlock) to prevent the welding system 100 to provide additional or alternate controls.

Additionally or alternatively, the remote device 94 can operate in a supervisory control mode, such that the system allows control of the welding system 100 for a particular operating parameter or a certain operating range or (e.g., while operating in constant voltage mode, voltage may be adjusted but within a range of 14-16 VDC). In some examples, a wireless remote device 94 is configured to control the starting and/or stopping of the engine 84 from each of the multiple control sources.

In some examples, the central control circuitry 90 generates an alert when an operating parameter value of the one or more operating parameters is adjusted at the welding system or the remote device, such as an audible, visual, and/or haptic indicator. The alert may be generated by the device or system that is making the adjustment (and/or experiencing a fault) and provide the alert to the central control circuitry 90 for transmission (and/or transmitted directly to one or more other devices or systems). For example, the alert can be provided via a first user interface associated with the power system 80 or a second user interface associated with remote device 94 and/or another remote control system (e.g., a remote computer, processor, smartphone, etc.).

In examples, the operator may be located remote from the power system 80, providing controls to the power system 80 from the remote device 94. In some examples, the operator is near the power system 80, and utilizes a user interface to send commands to or receive information from the control circuitry 112 (e.g., a user interface 114, 156, as shown in FIGS. 2A-2C).

FIG. 2A is a block diagram of an example welding system 100, which includes a welding-type power supply 102 containing the power circuitry 110 and control circuitry 112 described with respect to FIGS. 1A and 1B. As shown in FIG. 2A, the example welding system 100 also includes a wire feeder 104, and a welding torch 106. The remote device 94, the central control circuitry 90 and the central transceiver 92 are communicably coupled to the welding system 100, as well as the other components of power system 80. The welding system 100 powers, controls, and supplies consumables to a welding application. Although illustrated with respect to a welding type power supply 102 and welding wire feeder 104, the engine driven power system 80 may implement the multiple source control process independent of a welding power supply or controller (e.g., such as a home or portable generator, an engine powered vehicle, etc.).

In some examples, the central control circuitry 90 initiates a transfer of data between the remote system and the welding system at periodic intervals, in response to an adjustment to the one or more welding parameters, in response to a user input, or a combination thereof. The remote control circuitry of the remote device 94 further includes a network interface to connect to the central transceiver 92, the welding power supply 102, the wire feeder 104, and/or a remote computing system via one or more of network types or communications protocols, including by not limited to LAN, WAN, Bluetooth, Wi-Fi, or cellular networks.

In some examples, the remote device 94 is a portable handheld wireless device. In some examples, the remote device 94 is a smartphone, remote computer, tablet computer, dongle, accessory, or other device suitable to analyze, receive and/or transmit data wirelessly and/or via wired communications.

In examples, the remote user interface or the welding user interface comprises one or more of a button, a membrane panel switch, or a graphical user interface to provide input to control the welding system.

In some examples, signals communicated between the remote system and the welding system are encoded with information to uniquely identify the respective system. In some examples, the signals are transmitted with one or more transmission characteristics to uniquely identify the respective system.

In some examples, the remote device 94 is operable to control the start and/or stop of the engine 84. For instance, a user can provide an input via the remote user interface to control the engine to start, stop, or change engine speed. The input is transmitted to the central control circuitry 90 with data associated with the input. The remote device 94 then receives a confirmatory signal that the input was received at the central control circuitry 90 and that the operation of the engine 84 has been adjusted based on the input. As disclosed herein, in response to the adjustment, an indicia corresponding to the adjusted engine operation is displayed on the remote user interface (as well as the welding interface).

In some examples, the power supply 102 receives power from the engine 84 (e.g., via generator 86) and directly supplies input power to the welding torch 106 via power conversion circuitry 112. The welding torch 106 may be a torch configured for shielded metal arc welding (SMAW, or stick welding), gas tungsten arc welding (GTAW, or tungsten inert gas (TIG)) welding, gas metal arc welding (GMAW), flux cored arc welding (FCAW), based on the desired welding application. In the illustrated example, the power supply 102 is configured to supply power to the wire feeder 104, and the wire feeder 104 may be configured to route the input power to the welding torch 106. In addition to supplying an input power, the wire feeder 104 may supply a filler metal to a welding torch 106 for various welding applications (e.g., GMAW welding, flux core arc welding (FCAW)). While the example system 100 of FIG. 2A includes a wire feeder 104 (e.g., for GMAW or FCAW welding), the wire feeder 104 may be replaced by any other type of remote accessory device, such as a stick welding and/or GTAW welding remote control interface that provides stick and/or GTAW welding The power supply 102 receives primary power 108 (e.g., from the engine 84 and/or generator 86 of power system 80), conditions the primary power, and provides an output power to one or more welding devices in accordance with demands of the system 100. The power supply 102 includes the power conversion circuitry 110, which may include transformers, rectifiers, switches, and so forth, capable of converting the AC input power to AC and/or DC output power as dictated by the demands of the system 100 (e.g., particular welding processes and regimes). The power conversion circuitry 110 converts input power (e.g., the primary power 108) to welding-type power based on a weld voltage setpoint and outputs the welding-type power via a weld circuit.

In some examples, the power conversion circuitry 110 is configured to convert the primary power 108 to both welding-type power and auxiliary power outputs. However, in other examples, the power conversion circuitry 110 is adapted to convert primary power only to a weld power output, and a separate auxiliary converter 111 is provided to convert primary power to auxiliary power. In some other examples, the power supply 102 receives a converted auxiliary power output directly from a wall outlet. Any suitable power conversion system or mechanism may be employed by the power supply 102 to generate and supply both weld and auxiliary power.

The control circuitry 112 controls the operation of the power supply 102 and may control the operation of the engine driven power system 80 in some examples. The power supply 102 also includes one or more interfaces, such as a user interface 114 and network interface 117. The control circuitry 112 receives input from the user interface 114, through which a user may control one or more components (including the engine 84 and/or generator 86), and or choose a process and/or input desired parameters for a welding output (e.g., voltages, currents, particular pulsed or non-pulsed welding regimes, and so forth). The user interface 114 may receive inputs using one or more input devices 115, such as via a keypad, keyboard, physical buttons, a touch screen (e.g., software buttons), a voice activation system, a wireless device, remote device 94, etc. Furthermore, the control circuitry 112 controls operating parameters based on input by the user as well as based on other operating parameters. Specifically, the user interface 114 may include a display 116 for presenting, showing, or indicating, information to an operator. In some examples, the control circuitry 112 receives an input provided via remote device 94 via network interface 117. In this manner, the control circuitry 112 can provide data regarding operation of the system 80 (including alerts associated with operation of the engine 84) and/or receive commands from the remote device 94 (e.g., starting the engine 84).

The control circuitry 112 may also include interface circuitry for communicating data to other devices in the system 100, such as the wire feeder 104. For example, in some situations, the power supply 102 wirelessly communicates with other welding devices within the welding system 100. Further, in some situations, the power supply 102 communicates with other welding devices using a wired connection, such as by using a network interface controller (NIC) to communicate data via a network (e.g., ETHERNET, 10baseT, 10base100, etc.). In the example of FIG. 2A, the control circuitry 112 communicates with the wire feeder 104 via the weld circuit via a communications transceiver 118, as described below.

The control circuitry 112 includes at least one controller or processor 120 that controls the operations of the power supply 102. The control circuitry 112 receives and processes multiple inputs associated with the performance and demands of the system 100. The processor 120 may include one or more microprocessors, such as one or more "general-purpose" microprocessors, one or more special-purpose microprocessors and/or ASICS, and/or any other type of processing device. For example, the processor 120 may include one or more digital signal processors (DSPs).

The example control circuitry 112 includes one or more storage device(s) 123 and one or more memory device(s) 124. The storage device(s) 123 (e.g., nonvolatile storage) may include ROM, flash memory, a hard drive, and/or any other suitable optical, magnetic, and/or solid-state storage medium, and/or a combination thereof. The storage device 123 stores data (e.g., data corresponding to a welding application), instructions (e.g., software or firmware to perform welding processes), and/or any other appropriate data. Examples of stored data for a welding application include an attitude (e.g., orientation) of a welding torch, a distance between the contact tip and a workpiece, a voltage, a current, welding device settings, deposition rate, wire feed speed, puddle fluidity, and so forth.

The memory device 124 may include a volatile memory, such as random access memory (RAM), and/or a nonvolatile memory, such as read-only memory (ROM). The memory device 124 and/or the storage device(s) 123 may store a variety of information and may be used for various purposes. For example, the memory device 124 and/or the storage device(s) 123 may store processor executable instructions 125 (e.g., firmware or software) for the processor 120 to execute. In addition, one or more control regimes for various welding processes, along with associated settings and parameters, may be stored in the storage device 123 and/or memory device 124, along with code configured to provide a specific output (e.g., initiate wire feed, enable gas flow, capture welding related data, detect short circuit parameters, determine amount of spatter) during operation. One or more lists or lookup tables may be provided, and/or network connections to various databases available to inform decision-making, such as to access preferred welding parameters, to store updated welding parameter settings, etc.

In some examples, the central control circuitry 90 stores one or more lists associated with values associated with one or more welding parameters associated with the welding system including engine status, hours of operation, current, voltage, power and/or other values that correlate the characteristics to one or more indicia (e.g., an icon, text, a graphic, an animation, etc.), such as in memory 124. The central control circuitry 90 can access the one or more lists in response to an input (e.g., from an operator input). An input with data corresponding to the one or more operating parameters can be provided via user interface 114 and/or from remote device 94 via transceiver 92. In some examples, the central control circuitry 90 is configured to store the data in a memory storage device (e.g., memory 124). The data is analyzed to determine a parameter value associated with the received operating parameters. The parameter values are compared to a list of parameter icons that correlates parameter values to a plurality of icons. The central control circuitry 90 then determines a parameter icon corresponding to the operating parameters, and transmits icon data to the remote device or the welding power source for display on the remote user interface or the welding user interface, respectively. Thus, even as one control source generates the command to adjust a control parameter, each other device is provided the icons, text, and/or alerts representative of that adjustment.

In some examples, the central control circuitry 90 is in communication with a sensor 98 to receive, analyze and/or measure signal characteristics, such as associated with the one or more welding parameters. Thus, changes in output, operating parameters, even those that are uncommanded, are updated on the multiple sources.

In some examples, the welding power flows from the power conversion circuitry 110 through a weld cable 126 to the wire feeder 104 and the welding torch 106. The example weld cable 126 is attachable and detachable from weld studs at each of the power supply 102 and the wire feeder 104 (e.g., to enable ease of replacement of the weld cable 126 in case of wear or damage). Furthermore, in some examples, welding data is provided with the weld cable 126 such that welding power and weld data are provided and transmitted together over the weld cable 126. The communications transceiver 118 is communicatively coupled to the weld cable 126 to communicate (e.g., send/receive) data over the weld cable 126. The communications transceiver 118 may be implemented using serial communications (e.g., full-duplex RS-232 or RS-422, or half-duplex RS-485), network communications (e.g., Ethernet, PROFIBUS, IEEE 802.1X wireless communications, etc.), parallel communications, and/or any other type of communications techniques. In some examples, the communications transceiver 118 may implement communications over the weld cable 126.

The example communications transceiver 118 includes a receiver circuit 121 and a transmitter circuit 122. Generally, the receiver circuit 121 receives data transmitted by the wire feeder 104 via the weld cable 126 and the transmitter circuit 122 transmits data to the wire feeder 104 via the weld cable 126. The communications transceiver 118 enables remote configuration of the power supply 102 from the location of the wire feeder 104, and/or command and/or control of the wire feed speed output by the wire feeder 104 and/or the weld power (e.g., voltage, current) output by the power supply 102. In some examples, the communications are transmitted via a dedicated cable between components and/or wireless communications channels, as well as other suitable communications devices and/or techniques.

The example wire feeder 104 also includes a communications transceiver 119, which may be similar or identical in construction and/or function as the communications transceiver 118. While communication over a separate communications cable is illustrated in FIG. 2A, other communication media, such as wireless media, power line communications, and/or any other communications media, may be used.

In some examples, a gas supply 128 provides shielding gases, such as argon, helium, carbon dioxide, and so forth, depending upon the welding application. The shielding gas flows to a valve 130, which controls the flow of gas, and if desired, may be selected to allow for modulating or regulating the amount of gas supplied to a welding application. The valve 130 may be opened, closed, or otherwise operated by the control circuitry 112 to enable, inhibit, or control gas flow (e.g., shielding gas) through the valve 130. Shielding gas exits the valve 130 and flows through a cable 132 (which in some implementations may be packaged with the welding power output) to the wire feeder 104, which provides the shielding gas to the welding application. In some examples, the welding system 100 does not include the gas supply 128, the valve 130, and/or the cable 132.

In some examples, the wire feeder 104 uses the welding power to power the various components in the wire feeder 104, such as to power a wire feeder controller 134. As noted above, the weld cable 126 may be configured to provide or supply the welding power. The power supply 102 may also communicate with a communications transceiver 119 of the wire feeder 104 using the weld cable 126 and the communications transceiver 118 disposed within the power supply 102. In some examples, the communications transceiver 119 is substantially similar to the communications transceiver 118 of the power supply 102. The wire feeder controller 134 controls the operations of the wire feeder 104. In some examples, the wire feeder 104 uses the wire feeder controller 134 to detect whether the wire feeder 104 is in communication with the power supply 102 and to detect a current welding process of the power supply 102 if the wire feeder 104 is in communication with the power supply 102.

In examples, the power supply 102 delivers a power output directly to torch 106 without employing any contactor. In such an example, power regulation is governed by the control circuitry 112 and/or the power conversion circuitry 110. In some examples, a contactor 135 (e.g., high amperage relay) is employed and controlled by the wire feeder controller 134 and configured to enable or inhibit welding power to continue to flow to the weld cable 126 for the welding application. In some examples, the contactor 135 is an electromechanical device. However, the contactor 135 may be any other suitable device, such as a solid-state device. The wire feeder 104 includes a wire drive 136 that receives control signals from the wire feeder controller 134 to drive rollers 138 that rotate to pull wire off a spool 140 of wire. The wire is provided to the welding application through a torch cable 142. Likewise, the wire feeder 104 may provide the shielding gas from the cable 132 through the cable 142. The electrode wire, the shield gas, and the power from the weld cable 126 are bundled together in a single torch cable 144 and/or individually provided to the welding torch 106. In some examples, the contactor 135 is omitted and output or welding-type power is initiated and stopped by the power supply 102 without employing a contactor 135. In some examples, one or more sensors 127 are included with or connected to in the wire feeder 104 to monitor one or more welding parameters (e.g., power, voltage, current, wire feed speed, etc.) to inform the controller 134 during the welding process. In some examples, one or more sensors are included in the welding power supply 102.

In some examples, the remote device 94 includes remote control circuitry operable to transmit information to and receive information from an auxiliary device, such as wire feeder 104. The wire feeder 102 responds with diagnostic information, and the remote device 94 can store (in memory) and/or display the diagnostic information on the remote user interface.

In some examples, the remote device 94 serves as a link between the auxiliary devices and the central control circuitry 90. Thus, the remote device 94 can receive commands or data from the welding system (or the auxiliary device), and transmit the commands or data from the welding system (or the auxiliary device) to the auxiliary device (or the welding system).

The welding torch 106 delivers the wire, welding power, and/or shielding gas for a welding application. The welding torch 106 is used to establish a welding arc between the welding torch 106 and a workpiece 146. A work cable 148 couples the workpiece 146 to the power supply 102 (e.g., to the power conversion circuitry 110) to provide a return path for the weld current (e.g., as part of the weld circuit). The example work cable 148 is attachable and/or detachable from the power supply 102 for ease of replacement of the work cable 148. The work cable 148 may be terminated with a clamp 150 (or another power connecting device), which couples the power supply 102 to the workpiece 146. In some examples, one or more sensors 147 are included with or connected to the welding torch 106 to monitor one or more welding parameters (e.g., power, voltage, current, wire feed speed, etc.) to inform the controller 134 and/or 112 during the welding process. Although illustrated with the torch 106 (e.g., a welding tool, as described herein) connecting through wire feeder 104, in some examples, the welding tool can connect directly to the welding power supply 102. For instance, a gouging and/or cutting tool may connect directly to studs or another power outlet of the welding power supply 102. In some examples, a wire feeder is integrated with the power supply, and studs or other power outlets are provided on the housing of such an integrated enclosure.

FIG. 2B is a schematic diagram of another example welding system 152 in which the wire feeder 104 includes the user interface 114 in addition or as an alternative to the user interface on the welding power supply 102. In the example of FIG. 2B, the control circuitry 134 of the wire feeder 104 implements the determinations of the welding program and welding parameters which are described with reference to the control circuitry 112 of FIG. 2A.

FIG. 2C is a schematic diagram of another example welding system 154 including a separate user interface 156. The user interface 156 is a separate device, and may be connected to the welding power supply 102 and/or to the wire feeder 104 to provide commands and/or control information. The example user interface 156 includes the input devices 115 and the display 116, and includes control circuitry 158. The example control circuitry 158 includes the processor(s) 120 and the memory 124 storing the instructions 125. The example user interface 156 further includes a communications transceiver 119 to enable communications between the user interface 156 and the welding power supply 102 and/or the wire feeder.

Although FIGS. 2A-2C are illustrated as having a user interface (114, 156) incorporated with a particular system, the illustration is exemplary such that one or more of the interfaces disclosed herein as well as additional user interfaces may be incorporated in one or more of the example welding systems disclosed herein. Furthermore, although power supply 102 and wire feeder 104 are illustrated as independent units, in some examples, the power supply and wire feeder can be housed in a single enclosure or otherwise integrated. Additionally or alternatively, a single controller, control circuitry, and/or interface can control operation of the engine driven power system 80, the power supply 102, and wire feeder 104, in some examples.

Figure 3A:
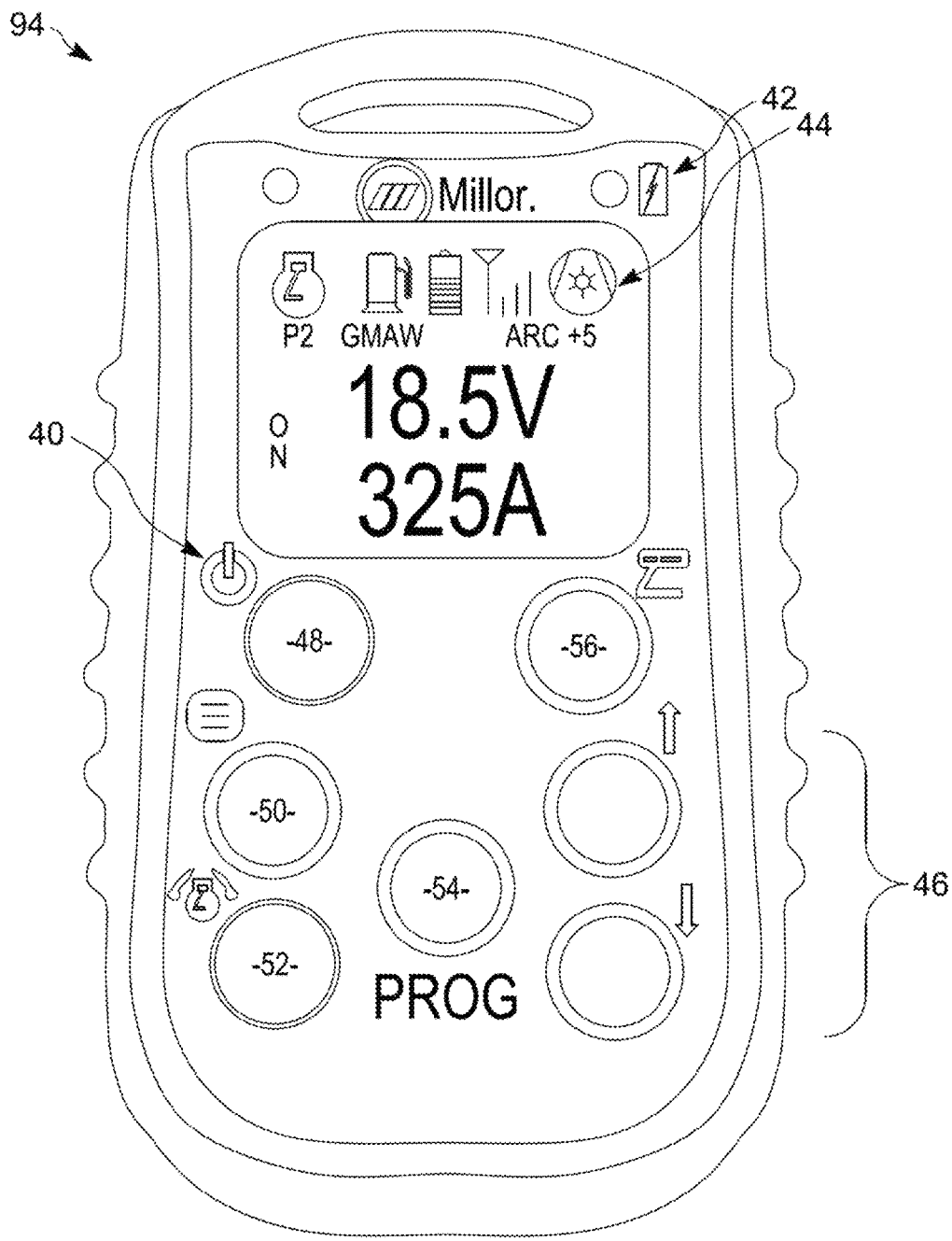
FIG. 3A is an illustration of an example remote device, in accordance with aspects of this disclosure.

FIG. 3A illustrates a detail view of the remote device 94. As shown, the remote device 94 provides one or more remote user interfaces, such as a battery indicator 42, a remote display 44, and one or more input devices 46-56 (e.g., a button, knob, switch, and/or a touchscreen). For example, the input devices 46-56 can allow a user to toggle through a selection via buttons 46. A selection can be made for various components of the power system 80, such as the engine 84 via input 52, welding process via input device 56, a welding sequence program via input device 54, power via input device 48, and/or call a menu via input device 50. Thus, the remote device 94 is operable to receive inputs from the input devices 46-56 associated with one or more commands, transmit signals comprising data corresponding to the inputs to the central control circuitry 90 (e.g., via a remote control circuit, not shown), and have an indicia on the remote display 44 change to reflect the command, as disclosed herein.

Figure 3B:
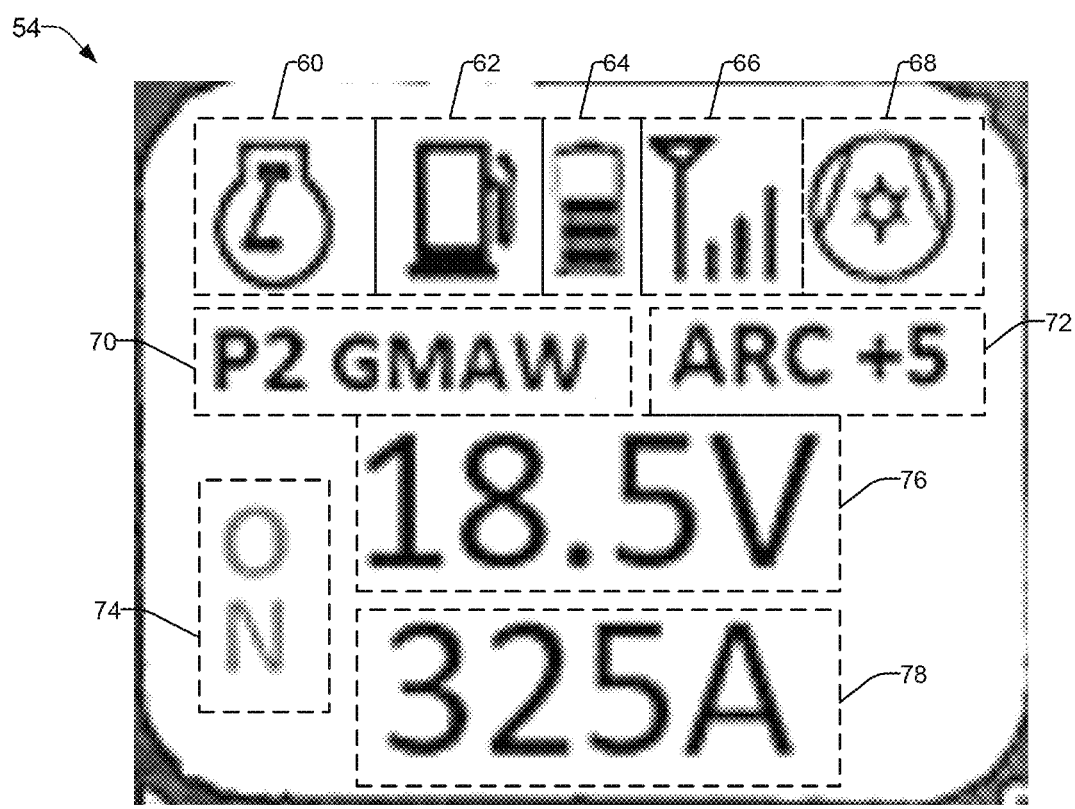
FIG. 3B is an illustration of an example display of a remote device, in accordance with aspects of this disclosure.

FIG. 3B illustrates a detail view of the remote display 44. As shown, the remote display 44 includes multiple regions, each to display one or more indicia corresponding to one or more operating parameters. In some examples, each region displays a single indicia, which may change color, flash, appear, disappear, or provide some other visual cue to provide information to the operator. In some examples, which indicia and/or which type of indicia is dynamic, such that the operator may select a particular indicia to be displayed in a predetermined region, and/or one or more events can trigger a transition from one indicia to another within a given region (e.g., when a battery is out of energy, a battery icon can be replaced with a lightning bolt indicating the battery is being charged).

In the example of FIG. 3B, the regions can include one or more of an icon, text, a graphic, or an animation. As shown, region 60 provides an engine icon, region 62 provides a fuel gauge icon, region 64 provides a battery level icon, region 66 provides a wireless signal icon, region 68 illustrates an air compressor icon, region 70 provides text indicative of a welding process, region 72 provides text indicative of an arc length, region 74 provides text indicative of a power on/off status, region 76 provides an output voltage icon, and region 78 provides an output current icon. As disclosed herein, each region and/or indicia can provide information associated with one or more welding parameters. Each indicia can be changed in response to a change to one or more of the welding parameters (and adjusted value) and/or a status change (a change in wireless signal strength). Additional or alternative indicia can correspond to engine run time, wire feed speed, welding sequence, material type, material thickness, for instance. Additionally, an indicia can provide information as to which of the multiple control sources is operating in dedicated control mode and which is operating in a supervisory or display only mode.

Figure 4:
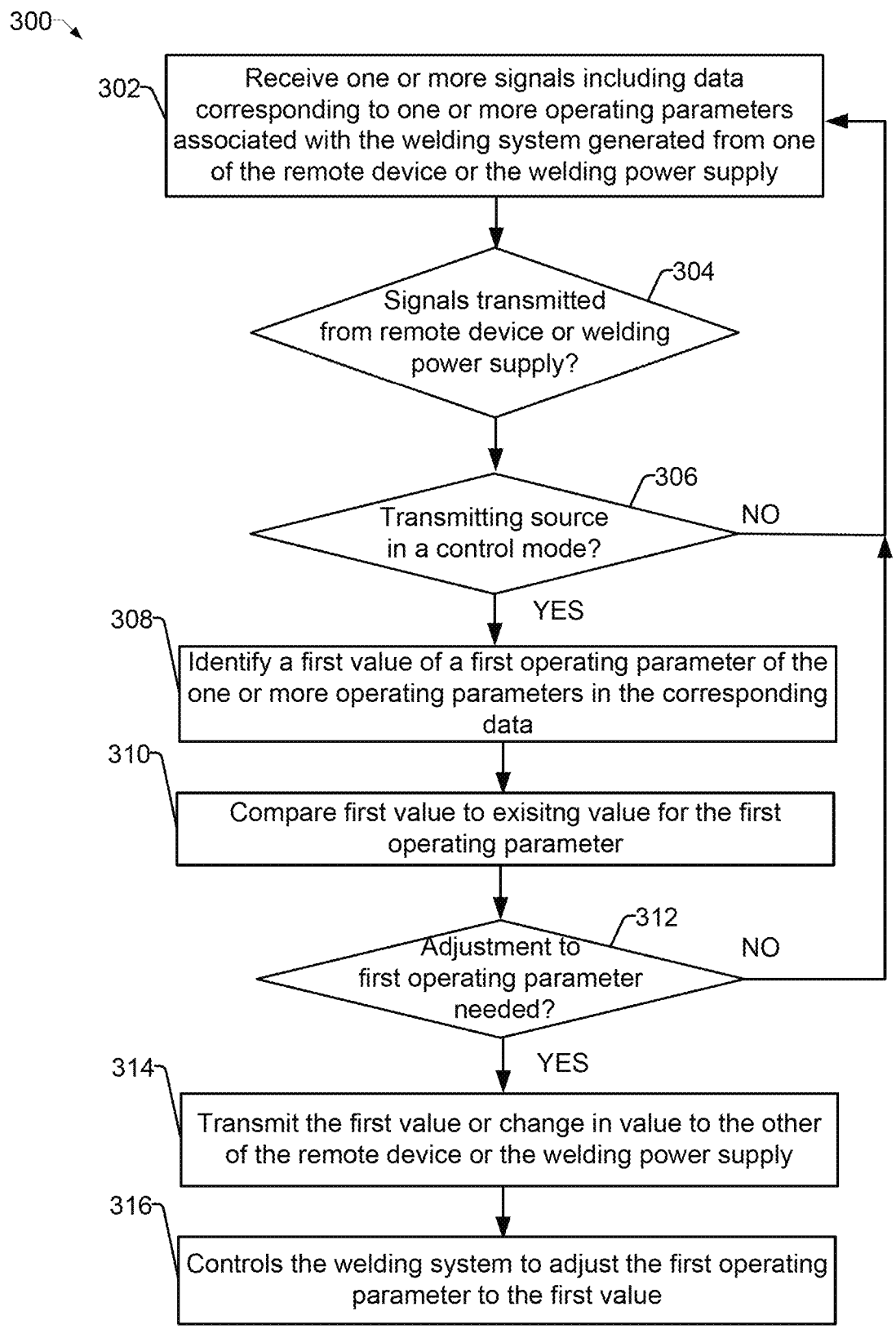
FIG. 4 is a flowchart representative of an example method of multiple source control of an engine driven power system, in accordance with aspects of this disclosure.

FIG. 4 provides a flowchart representative of example machine readable instructions 300 which may be executed by the example system 80 of FIG. 1A. The example instructions 300 may be stored in the storage device(s) 123 and/or the memory 124 and executed by the processor(s) 120 of the control circuitry 112. The example instructions 300 are described below with reference to the systems of FIGS. 1A through 2C.

In block 302, receive at the central control circuitry 90 via the central transceiver 92 one or more signals including data corresponding to one or more operating parameters associated with the power system 80 generated from one of the remote device 94 or the welding power supply 102 (or in some examples, the wire feeder 104 or the user interface 156).

In block 304, the central control circuitry determines whether the signals were transmitted from the remote device or the welding power supply. In block 306, the central control circuitry determines whether the transmitting source is in a control mode (a shared control mode, a supervisory control mode, or dedicated control mode). For example, if the transmitting source is in a shared or dedicated control mode, the central control circuit can proceed to block 308. If in a supervisory control mode, however, the central control circuitry further determines whether the commanded adjustment is within the parameters of the supervisory control (e.g., the selected operating parameter and/or range of values). If the transmitting source is not in a control mode, the method returns to block 302.

If the transmitting source is in a control mode and making an authorized command, in block 308, the central control circuitry identifies a first value of a first operating parameter of the one or more operating parameters in the corresponding data.

In block 310, the central control circuitry compares the first value against an existing value for the first operating parameter and determines if an adjustment is needed in block 312. If no adjustment is needed, the method returns to block 302. If an adjustment is required to the first operating parameter, the method advances to block 314 to transmit the first value (or the change in value) to the other of the remote device or the welding power supply that did not generate the one or more signals. In block 316, the central control circuitry controls the welding power system to adjust the first operating parameter to the first value.

The present devices and/or methods may be realized in hardware, software, or a combination of hardware and software. The present methods and/or systems may be realized in a centralized fashion in at least one computing system, processors, and/or other logic circuits, or in a distributed fashion where different elements are spread across several interconnected computing systems, processors, and/or other logic circuits. Any kind of computing system or other apparatus adapted for carrying out the methods described herein is suited. A typical combination of hardware and software may be a processing system integrated into a welding power supply with a program or other code that, when being loaded and executed, controls the welding power supply such that it carries out the methods described herein. Another typical implementation may comprise an application specific integrated circuit or chip such as field programmable gate arrays (FPGAs), a programmable logic device (PLD) or complex programmable logic device (CPLD), and/or a system-on-a-chip (SoC). Some implementations may comprise a non-transitory machine-readable (e.g., computer readable) medium (e.g., FLASH memory, optical disk, magnetic storage disk, or the like) having stored thereon one or more lines of code executable by a machine, thereby causing the machine to perform processes as described herein. As used herein, the term "non-transitory machine readable medium" is defined to include all types of machine-readable storage media and to exclude propagating signals.

The control circuitry may identify welding conditions of a given weld and automatically find the optimum value of one or more welding parameters for the welding conditions. An example control circuit implementation may be an Atmel Mega16 microcontroller, a STM32F407 microcontroller, a field programmable logic circuit and/or any other control or logic circuit capable of executing instructions that executes weld control software. The control circuit could also be implemented in analog circuits and/or a combination of digital and analog circuitry. Examples are described herein with reference to various types of welders, but may be used or modified for use in any type of high frequency switching power source.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. A welding power system comprising:
   a remote device for monitoring or controlling the welding power system;
   a welding power supply to control and deliver power to one or more welding tools or accessories, wherein the remote device is connected to the welding power supply and the one or more welding tools or accessories; and
   a central control circuitry comprising a central transceiver configured to transmit one or more signals to or receive one or more signals from the remote device or the welding power supply, the one or more signals including data corresponding to one or more operating parameters associated with the welding power system, wherein the central control circuitry configured to:
   receive the one or more signals generated from one of the remote device or the welding power supply;
   identify a first value of a first operating parameter of the one or more operating parameters in the corresponding data;
   transmit the first value to the remote device;
   control the remote device to transmit the first value to the one or more welding tools or the accessories from the welding power supply;
   activate a supervisory mode to limit the remote device control of the one or more operating parameters of the welding power system to a predetermined range of values;
   adjust the one or more operating parameters by a first range in the supervisory mode and adjust the one or more operating parameters by a second range when not in the supervisory mode; and
   control the one or more welding tools or the accessories to adjust the first operating parameter to the first value.

2. The welding power system as defined in claim 1, wherein the remote device is configured to adjust a voltage value by a range in the supervisory mode.

3. The welding power system as defined in claim 1, wherein the central control circuitry is further configured to transmit a lock signal to activate a mechanical interlock at the welding power supply to prevent the remote user interface from controlling the welding power system in a display only mode.

4. The welding power system as defined in claim 1, wherein the remote device comprises a dedicated control mode such that a welding user interface is prevented from controlling the welding power system.

5. The welding power system as defined in claim 4, wherein the remote device is further configured to transmit a lock signal to activate an interlock to prevent the welding user interface from controlling the welding power system.

6. The welding power system as defined in claim 1, wherein remote control circuitry is further configured to:
receive an input via the remote user interface to control the first operating parameter;
transmit data associated with the input to the central control circuitry;
receive a confirmation signal that the input was received at the central control circuitry and that the welding power system has adjusted the first operating parameter based on the input; and
adjust an indicia corresponding to the first operating parameter on the remote user interface to reflect the change at the welding power system.

7. The welding power system as defined in claim 1, wherein the one or more parameters comprise one or more of a voltage, a current, a power value, an engine status, or a welding process.

8. The welding power system as defined in claim 1, wherein the central control circuitry is further configured to generate an alert when an operating parameter value of the one or more operating parameters is adjusted at the welding power system or the remote device.

9. The welding power system as defined in claim 1, wherein the central control circuitry is further configured to initiate transfer of data between the remote system and the welding power system at periodic intervals, in response to an adjustment to the one or more welding parameters, in response to a user input, or a combination thereof.

10. The welding power system as defined in claim 1, wherein the remote control circuitry further comprises a network interface to connect to a remote computing system via one or more of LAN, WAN, Bluetooth, Wi-Fi, or cellular networks.

11. A hybrid welding power system comprising:
a remote device for monitoring or controlling the welding power system;
a welding power supply to control and deliver power to one or more welding tools or accessories, the welding power supply configured to receive power from an energy storage device and an engine, and to condition the power for operation of the one or more welding tools or accessories, wherein the remote device is connected to the welding power supply and the one or more welding tools or accessories; and
a central control circuitry comprising a central transceiver configured to transmit one or more signals to or receive one or more signals from the remote device, the one or more welding tools or accessories, or the welding power supply, the one or more signals including data corresponding to one or more operating parameters associated with the welding power system or the one or more welding tools or accessories, wherein the central control circuitry is configured to:
receive the one or more signals generated from the one or more welding tools or accessories;
identify a first value of a first operating parameter of the one or more operating parameters of the one or more welding tools or accessories in the corresponding data;
transmit the first value to the welding power supply from the one or more welding tools or accessories via the remote device;
control the welding power system to adjust the first operating parameter to the first value;
store the data corresponding to the one or more operating parameters in a memory storage device;
analyze the data corresponding to the one or more operating parameters to determine parameter values associated with the one or more operating parameters;
compare the parameter values to a list of parameter icons that correlates parameter values to a plurality of icons;
determine a parameter icon of the plurality of icons corresponding to the one or more operating parameters; and
transmit icon data to the remote device or the welding power source for display on the remote user interface or the welding user interface, respectively.

12. The hybrid welding power system as defined in claim 11, wherein the remote device is a portable handheld wireless device.

13. The hybrid welding power system as defined in claim 11, wherein the remote control circuitry is further configured to:
transmit information to and receive information from an auxiliary device;
receive diagnostic information from the auxiliary device; and
display the diagnostic information on one or more regions of the remote user interface.

14. The hybrid welding power system as defined in claim 13, wherein the remote control circuitry is further configured to:
receive commands or data from the welding power supply; and
transmit the commands or data from the welding power supply to the auxiliary device.

15. The hybrid welding power system as defined in claim 13, wherein the remote control circuitry is further configured to:
receive commands or data from the auxiliary device; and
transmit the commands or data from the auxiliary device to the welding power supply.

16. The hybrid welding power system as defined in claim 11, wherein the remote user interface or the welding user interface comprises one or more of a knob, a membrane panel switch, or a graphical user interface to provide input to control the welding power system.

17. The hybrid welding power system as defined in claim 11, wherein the signals between the remote system and the welding power system are encoded with information to uniquely identify the respective system.

18. The hybrid welding power system as defined in claim 11, wherein the signals between the remote system and the welding power system are transmitted with one or more transmission characteristics to uniquely identify the respective system.

19. The hybrid welding power system as defined in claim 11, further comprising an engine configured to turn a generator to provide power to the welding power supply, the remote system being further configured to:

receive an input via the remote user interface to control the engine to start, stop, or change engine speed;

transmit data associated with the input to the central control circuitry;

receive a confirmation signal that the input was received at the central control circuitry and that the engine operation has been adjusted based on the input; and display an indicia corresponding to adjusted engine operation on the remote user interface.

* * * * *